(No Model.) 2 Sheets—Sheet 1.
P. PATTERSON.
APPARATUS FOR WELDING TUBING.
No. 416,374. Patented Dec. 3, 1889.
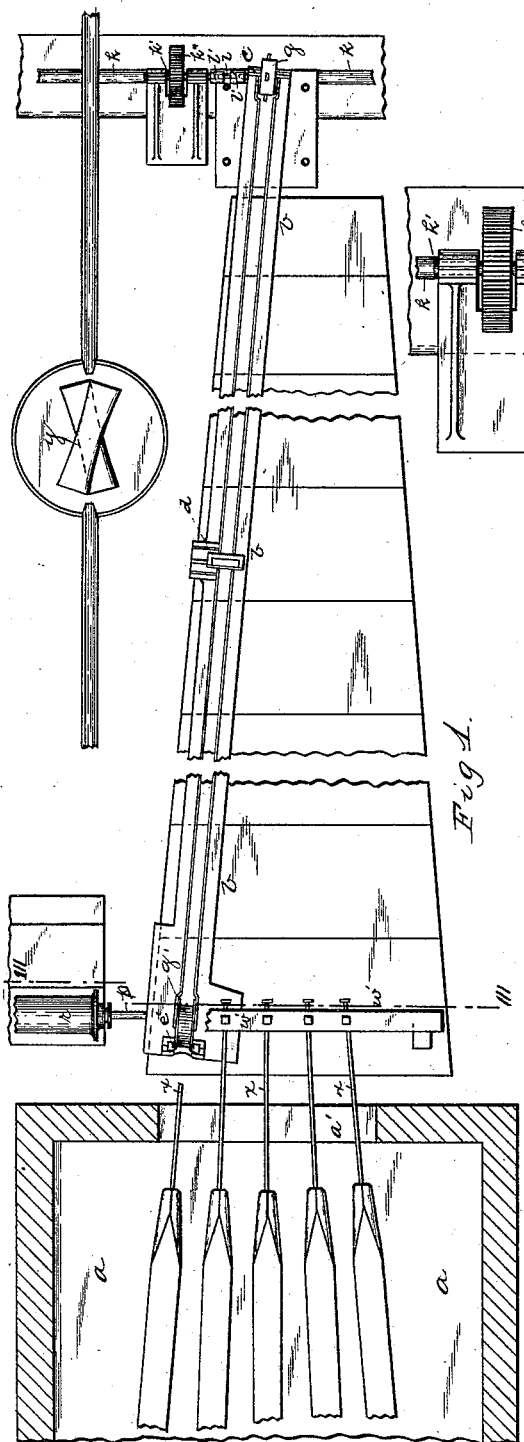
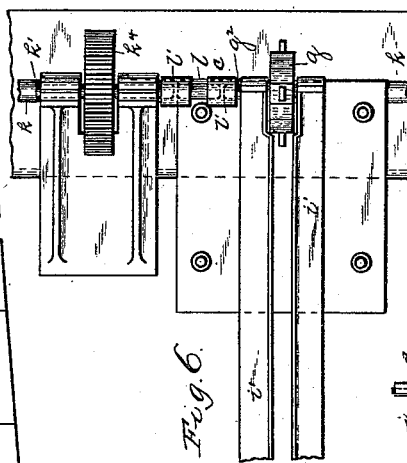
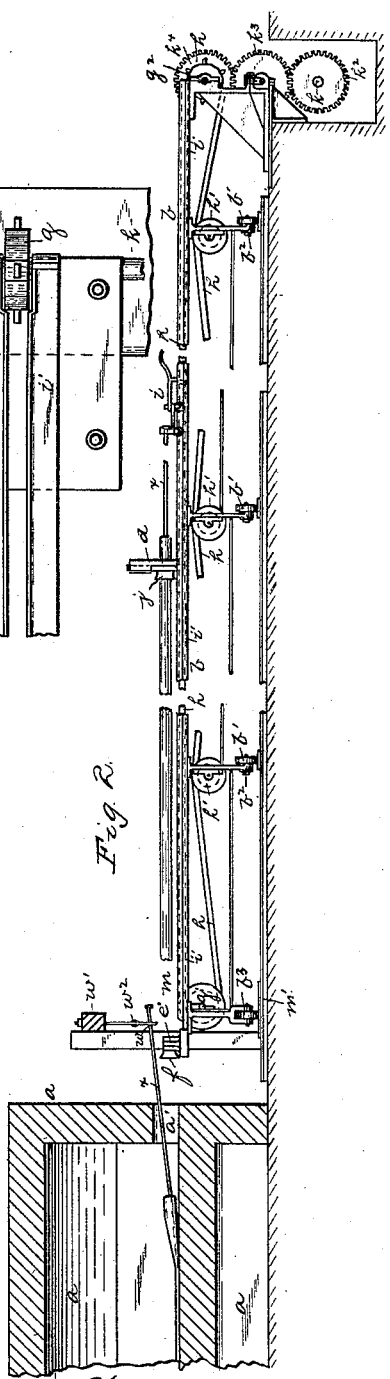
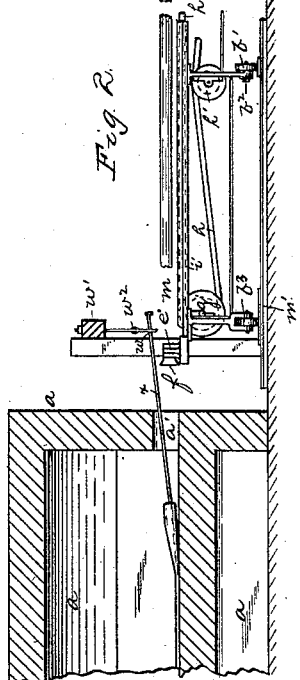
Witnesses:
J. N. Cooke
Robt. D. Totten
Inventor
Peter Patterson
By James I. Kay
Attorney (No Model.) 2 Sheets—Sheet 2.
P. PATTERSON.
APPARATUS FOR WELDING TUBING.
No. 416,374. Patented Dec. 3, 1889.
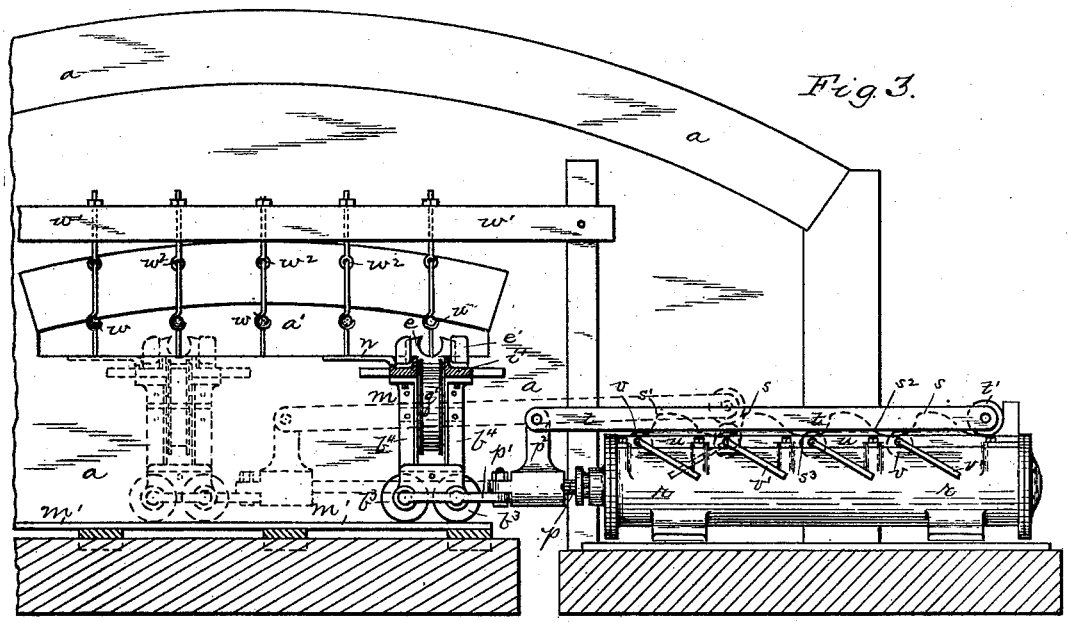
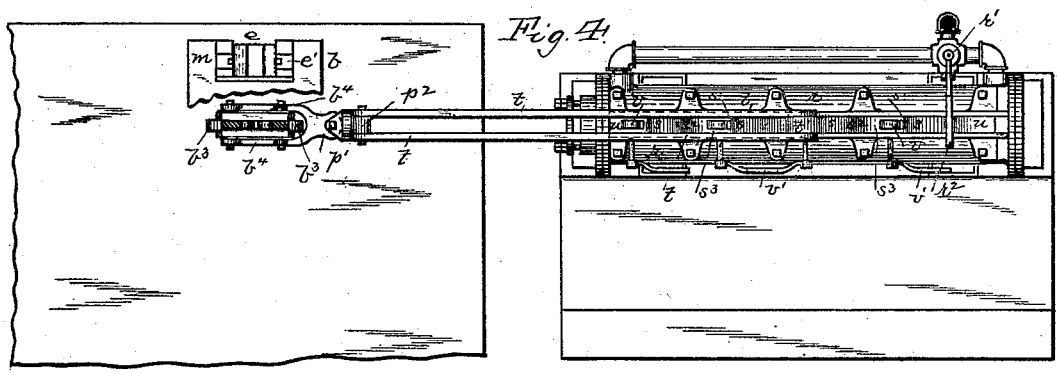
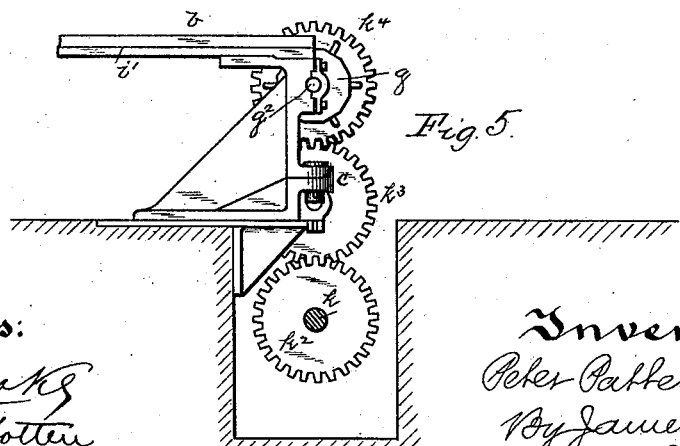
Witnesses:
J. A. Cooke
Robt. D. Totten
Inventor
Peter Patterson
By James I. Kay
Attorney

UNITED STATES PATENT OFFICE.

PETER PATTERSON, OF McKEESPORT, PENNSYLVANIA, ASSIGNOR OF ONE-HALF TO THE NATIONAL TUBE WORKS CO., OF SAME PLACE.

APPARATUS FOR WELDING TUBING.

SPECIFICATION forming part of Letters Patent No. 416,374, dated December 3, 1889.

Application filed July 8, 1889. Serial No. 316,860. (No model.)

*To all whom it may concern:*

Be it known that I, PETER PATTERSON, a resident of McKeesport, in the county of Allegheny and State of Pennsylvania, have invented a new and useful Improvement in Apparatus for Welding Tubing; and I do hereby declare the following to be a full, clear, and exact description thereof.

My invention relates to the manufacture of what is known as "butt-weld tubing," this tubing being formed of plate metal and bent to tubular shape and its meeting edges welded together in suitable dies. The most approved method of making this butt-weld tubing heretofore practiced has been to weld a rod to the end of the plate from which the tube is to be formed and bringing this plate to a welding heat in a suitable furnace, and draw the plate by means of said rod through a bell-shaped die, generally termed a "bell," the sides of the plate being turned over so as to bring it to tubular form, and the edges of the plate being butted and compressed together within the die and so welded. In welding tubing in this manner a long draw-bench has heretofore been employed, the draw-bench being mounted stationary before the mouth of the welding-furnace, and the draw-bench having at its forward end a holder to support the welding die or bell, and a chain traveling in said draw-bench, and a buggy running on a track on the draw-bench and acting to draw the blank through the die by first engaging with the "tang" or drawing-rod secured to the tube-blank, and then engaging with the traveling chain and so drawing the blank through the welding die or bell. In the most approved draw-bench employed for this purpose—such as shown in Letters Patent No. 341,162, granted to me, dated May 4, 1886—the draw-bench has also a second bell-holder, which is adapted to intercept and hold a second bell, termed a "reducing-bell," so that after the blank is drawn through the first welding-bell the reducing-bell is caught by this bell-holder and the welded tube drawn through the second bell, the blank being thus welded into tube, and the tube subsequently compacted, reduced, and sized in the second bell. In performing this operation it has been found that about three different plates or blanks could be operated in the furnace at one time, and the operators manipulated these blanks so that they would feed the blanks into the furnace and feed them from the furnace to the welding apparatus in such way that they could maintain a continuous feeding of the blanks to the welding apparatus. This, however, required the moving of the blanks within the furnace and increased the work of the operators, and in making the larger sizes of butt-weld tubing, as the blanks were rather heavy, this work was laborious, while in forming such sizes of tubing, as it required a longer time for the plate or blank to be brought to a welding heat in the furnace, it was desirable to be able to heat more blanks in the furnace at the same time and to do away with the necessity of handling the blanks while in the furnace.

My present invention is directed to apparatus for accomplishing these results; and it consists, generally stated, in combining certain improvements in a movable draw-bench in front of the furnace, as well as in certain other improvements directed to the proper operation of the draw-bench, the application of power to the driving-chain, the holding of the draw-bench in the different positions into which it is brought in drawing the blanks from the furnace, and to other details, as will be hereinafter more fully set forth and claimed.

To enable others skilled in the art to make and use my invention, I will describe the same more fully, referring to the accompanying drawings, in which—

Figure 1 is a plan view of the furnace and draw-bench and its connections. Fig. 2 is a side view of the draw-bench and a sectional view of the furnace. Fig. 3 is a cross-section on the line III III, Fig. 1, looking toward the furnace. Fig. 4 is an enlarged plan view of the front and of the draw-bench. Fig. 5 is an enlarged side view of the rear end of the draw-bench, showing the method of pivoting the same; and Fig. 6 is an enlarged plan view of the same.

Like letters of reference indicate like parts in each.

The furnace *a* is of proper size to receive on its hearth a suitable number of plates or blanks, five being shown in the drawings, and its door or mouth $a'$ is made wider than the ordinary furnace-door, so as to provide for the drawing of the blanks from different parts of the furnace. The draw-bench $b$ is made movable, as above stated, in the apparatus shown being pivoted at the rear end, as at $c$, and being supported on a series of rollers $b'$, secured to vertical arms $b^2$ and traveling over the mill-floor. The draw-bench is preferably made over twice the length of the tube to be drawn, as two drawing operations are performed on the bench, the blank being drawn through a die $f$, supported in the holder $e$ at the forward end of the draw-bench, and then through a die $j$, supported in the holder $d$ after they are drawn entirely through the die at the forward end of the bench. Any suitable pipe-welding apparatus, either for bell or tongs, may of course be employed at the forward end of the draw-bench as well as at the second holder $d$, the construction preferred by me being a bell-stand $e'$, in which is secured the bell-holder $e$, this bell-holder having a recess therein corresponding to the outer shape of the welding-bell $f$, and having a slot in the upper part thereof, through which the drawing-rod is dropped, as hereinafter described. The bell-holder $d$ is preferably made movable, so that when the blank has been drawn through the welding-bell this bell-holder $d$ will pass across the course of the drawing-rod and catch the reducing-bell $j$ and hold the same while a pipe is drawn through said bell. Mounted at the rear end of the draw-bench is the sprocket-wheel $g$, a pulley $g'$ being mounted at the forward end of the bench, and a traveling chain $h$, as shown partly by dotted lines, traveling rearwardly in guideways along the top of the draw-bench and returning to the forward end over a series of pulleys $h'$, as shown. On each side of this chain is the track $i'$, on which runs the buggy $i$, this buggy being of the ordinary or any suitable construction and acting to engage with the tang or drawing-rod $x$, secured to the blanks, as shown.

In order to apply the necessary power to the traveling chain, I mount in stationary bearings at one side of the draw-bench a driving-shaft $k'$, to which power is imparted from the power-shaft $k$ through suitable gearing $k^2$ $k^3$ $k^4$, and the shaft $g^2$, carrying the rear sprocket-wheel, is connected to the driving-shaft $k'$ by means of a movable joint. (Shown more particularly in Fig. 6.) The two shafts are connected by a short link-bar $l$ and the collars $l'$, the angular heads of the shafts and link-bars being so constructed as to permit of the slight deflection of the shaft from a right line according as the draw-bench is swung from one side to the other. Such construction provides for the transmission of power to the traveling chain without causing any deflection and consequently frictional action and wearing of the chain, which would occur if the chain itself were deflected on the movement of the draw-bench. The forward end $m$ of the draw-bench preferably travels on a platform or plate $m'$, and the bench has the legs $b^4$ extending down therefrom at intervals, each leg having the two pulleys $b^3$ to support the draw-bench and prevent its canting. The forward end $m$ is of proper height to hold the bell-holder $e$ in line with the door $a'$ of the furnace, and in order to provide for the feeding of the furnace the movable draw-bench carries at the forward end and at one side thereof the guideway $n$, over which the tanged plates or blanks are fed to the furnace.

Any suitable means for applying power to the movable draw-bench may of course be employed, that shown in the drawings being found well suited for the purpose, as it enables me to hold the draw-bench in whatever position is desired. In said apparatus the piston-rod $p$ is connected to the forward carriage $m$ of the draw-bench by a link $p'$ in the carriage, which permits of the swinging of the forward end of the draw-bench without throwing strain upon the piston-rod. The piston connected to this rod works within the cylinder $r$, which is supported on a suitable foundation and extends transversely to the draw-bench. It is provided with suitable valve apparatus $r'$, the valve-rod $r^2$ of which extends over into convenient position for operation by the attendant having charge of the moving of the draw-bench. The cylinder $r$ has secured to the upper surface thereof a series of stops $s$, five of these stops being shown in the drawings, and the stops have the shoulders $s'$ and inclined faces $s^2$ and the depressions $s^3$ between them. Secured to the piston-rod $p$ is an arm $p^2$, which extends above the same, and pivoted at the upper end of said arm is the frame $t$, carrying at its forward end the idle-roller $t'$, this roller having its course over the series of stops $s$, and the roller fitting against the shoulders $s'$ of the stops, as shown, and within the depressions $s^3$. Journaled in the plate $u$, carrying the said series of stops, and under each depression $s^3$ is the eccentric $v$, this eccentric having secured to it the lever $v'$, and being of proper size to lift the idle-roller $t'$ of the frame $t$ out of the depression and to such a height as to enable it to pass over the stop into the next depression, the operation of this apparatus being such that the movement of the frame $t$, and consequently of the carriage $m$ and draw-bench, is limited by the pressure of said idle-roller against the stops or shoulders, even though steam or other pressure may be thrown upon the proper side of the piston, and the draw-bench will thus be held in position until the eccentric $v$ under the roller is raised by its lever and the roller brought to the proper height to be forced over the stop and into the next depression, when it catches against the next shoulder, and is held until raised by the eccentric under that depression and so passed into the next depression and against the next stop. In order to support the drawing-rods $x$ out of the way of the draw-bench as it is moved across the bench, I provide a series of hooks $w$, corresponding to the number of plates in the furnace, depending from the cross-bar $w'$ and hanging above the forward end of the draw-bench. These hooks have the flexible joints $w^2$ therein to enable them to swing out of the way of the operator or the plates inserted when operating the furnace.

Besides the draw-bench, in order to illustrate the operation of making the tubing, are shown the ordinary cross-rolls, as at $y$, together with the troughs to feed them to and receive them from said rollers.

In making tubing by means of said apparatus, the plates are charged into the furnace, as shown, the tangs or drawing-rods $x$ either resting on the base of the furnace-door or being caught in suitable hooks, and the furnace being fed from left to right, the plates being inserted at the proper intervals. When the first plate is ready for welding, the workmen operating the draw-bench admit steam or other fluid under pressure to the right side of the piston, which forces the draw-bench over to the left side and into position to draw the first blank, the idle-roller $t'$ on the frame $t$ passing over the inclined faces and finally resting in the depression $s^3$ at the left end of the cylinder. By operating the valve a slight amount of steam is then thrown on the left side of the piston, which presses the roller $t'$ against the first stop $s$, so holding the draw-bench in position. The welder then picks up the drawing-rod or tang, passes a welding-bell $f$ over the same, drops the tang through the bell-holder, passing the second bell or reducing-bell $j$ over the rod, but back of the bell-holder, and he then drops the knobbed end of the rod into the forked head on the traveling buggy, and the buggy-boy drops the hook on the buggy into the traveling chain. The blank is thus drawn through the welding-bell $f$, and is bent thereby to the proper cylindrical shape and its edges butted and welded together, and as soon as the blank is drawn out of the welding-bell the second bell-holder $d$ catches or intercepts the reducing-bell $j$, and as the buggy travels on, drawing the welded tube with it, the tube is drawn through this reducing-bell and compacted and sized therein, so completing the drawing of the tube. As soon as the tube leaves the second or reducing bell it is disengaged from the buggy, the tang or drawing-rod cut therefrom by shears located in suitable position, and the tube is fed to the cross-rollers through the trough, the tube by said rolls being brought to the true cylindrical shape. Meantime, as soon as the tube has left the welding-bell $f$, the workmen pass another plate over the guideway $n$ into the furnace to occupy the place of the tube just drawn and catch the drawing-rod on the hook $w$, provided for the purpose, and as soon as this is entered the workmen operating the draw-bench raise the eccentric $v$ directly below the idle-roller $t'$, raising the roller out of the depression, when the fluid under pressure in the cylinder is free to draw the bench over toward the right, the idle-roller $t'$ descending the inclined face $s^2$ and striking the shoulder $s'$ of the next stop, against which it is held during the next drawing operation. Meanwhile the welder has passed his welding-bell over the drawing-rod of the next blank to be drawn, and he repeats the operation above described in regard to that, and when this tube is drawn another blank placed within the furnace occupying the space from which it was drawn, and this is continued until the five blanks are drawn. As soon as the last blank is drawn and one introduced into the furnace in its place the workman operating the draw-bench through the mechanism above described moves the drawing-bench over to the left side of the furnace, so that it is again in position to draw the tube to the extreme left thereof and the operations described are continued.

By the mechanism above described I am thus enabled to provide for the welding of a larger number of tubes, the heating of a larger number of blanks within the furnace, overcome the necessity of handling the plates after they are placed in the furnace, and so provide for the more regular and even heating of the plates and materially reduce the work of the welder, while largely increasing the output.

For the larger sizes of tubing I am also enabled to provide an apparatus which will permit of the heating of a larger number of plates in the furnace, and consequently provide for the continuous drawing of the tubing without unnecessary delays in waiting for the heating of the blank.

What I claim as my invention, and desire to secure by Letters Patent, is—

1. In apparatus for welding tubing, the combination, with the furnace, of a movable draw-bench in front of the furnace and moving across the mouth thereof, and having a support or holder for the welding-die at the forward end thereof, and having a guideway beside said support for introducing the blanks into the furnace, substantially as and for the purposes set forth.

2. In apparatus for welding tubing, the movable draw-bench pivoted at its rear end and having the rear sprocket-wheel mounted thereon, in combination with a driving-shaft journaled in the stationary bearings beside the same and a movable joint-connection between the driving-shaft and sprocket-wheel, substantially as and for the purposes set forth.

3. In apparatus for welding tubing, the combination, with a welding-furnace and a movable draw-bench in front of and traveling across the mouth thereof, of a series of hooks suspended above the draw-bench to hold the drawing-rods of the blanks within the furnace, substantially as and for the purposes set forth.

4. In apparatus for welding tubing, the combination, with a furnace, of the movable draw-bench in front of the furnace, the power-operated piston connected to the movable draw-bench to move the same across the mouth of the furnace, and stop mechanism controlling the movement of the piston, substantially as and for the purposes set forth.

5. In apparatus for welding tubing, the combination of a movable draw-bench and piston or bar connected thereto and a series of stops to limit the motion of the bar and draw-bench, substantially as and for the purposes set forth.

6. The combination of the movable draw-bench, the piston or bar connected therewith, the cylinder or support having a series of stops or shoulders, and the frame or arm connected to the bar and engaging with said shoulders, substantially as and for the purposes set forth.

7. The combination of the movable draw-bench, the piston or bar connected thereto, the cylinder or support having a series of stops or shoulders, and the frame or arm connected to the bar and engaging with said shoulders, and eccentrics or other lifting devices for raising said arm from engagement with said shoulders, substantially as and for the purposes set forth.

In testimony whereof I, the said PETER PATTERSON, have hereunto set my hand.

PETER PATTERSON.

Witnesses:
DANIEL A. FARLEY,
PHILLIP L. HOFFMANN, Jr.